(12) United States Patent
Rutherford et al.

(10) Patent No.: US 12,006,466 B2
(45) Date of Patent: Jun. 11, 2024

(54) DISSOLVABLE SLEEVE FOR HYDROCARBON WELL COMPLETIONS

(71) Applicant: CONOCOPHILLIPS COMPANY, Houston, TX (US)

(72) Inventors: James Rutherford, Tananger (NO); Roy Middleton, Tananger (NO)

(73) Assignee: CONOCOPHILLIPS COMPANY, Houston, TX (US)

( * ) Notice: Subject to any disclaimer, the term of this patent is extended or adjusted under 35 U.S.C. 154(b) by 99 days.

(21) Appl. No.: 17/832,149

(22) Filed: Jun. 3, 2022

(65) Prior Publication Data

US 2022/0389301 A1    Dec. 8, 2022

Related U.S. Application Data

(60) Provisional application No. 63/196,545, filed on Jun. 3, 2021.

(51) Int. Cl.
*C09K 8/40* (2006.01)
(52) U.S. Cl.
CPC ..................... *C09K 8/40* (2013.01)
(58) Field of Classification Search
CPC ........ E21B 34/063; E21B 37/00; E21B 37/10; C09K 8/40
See application file for complete search history.

(56) References Cited

U.S. PATENT DOCUMENTS

| | | | |
|---|---|---|---|
| 4,505,017 A | 3/1985 | Schukei | |
| 4,673,039 A * | 6/1987 | Mohaupt | E21B 43/11 166/299 |
| 7,240,731 B2 | 7/2007 | Carmody et al. | |
| 8,720,559 B2 | 5/2014 | Johnson et al. | |
| 10,844,692 B1 * | 11/2020 | Griffin | E21B 33/08 |
| 2018/0328140 A1 * | 11/2018 | Schmidt | E21B 21/103 |
| 2018/0334870 A1 * | 11/2018 | Rodriguez | E21B 23/02 |
| 2018/0355976 A1 * | 12/2018 | Markiw | E21B 34/142 |
| 2019/0040695 A1 | 2/2019 | Sim | |
| 2019/0055809 A1 * | 2/2019 | Ellithorp | E21B 33/124 |
| 2021/0123321 A1 * | 4/2021 | Assal | E21B 23/01 |
| 2022/0018202 A1 * | 1/2022 | Rutherford | E21B 43/10 |
| 2022/0372842 A1 * | 11/2022 | Saraya | E21B 34/14 |

\* cited by examiner

*Primary Examiner* — Shane Bomar
(74) *Attorney, Agent, or Firm* — CONOCOPHILLIPS COMPANY

(57) ABSTRACT

The invention relates to the use of a sleeve (9) installed in a liner or casing (1) prior to a cementing operation. Completion equipment in the liner/casing creates an irregular inner profile which can cause cement to get trapped. A wiper dart (3) passed down the casing/liner (1) may have difficulty removing all residual cement (5). By using a sleeve or insert (8) in the liner/casing (1), a smooth inner profile (9) may be created which can be cleaned relatively easily by a wiper dart. Once cementing and cleaning are complete, the sleeve (9) may be removed by wellbore fluid or acid if it is made from a dissolvable material such as aluminum or magnesium.

12 Claims, 1 Drawing Sheet

DISSOLVABLE SLEEVE FOR HYDROCARBON WELL COMPLETIONS

CROSS-REFERENCE TO RELATED APPLICATIONS

This application is a non-provisional application which claims benefit under 35 USC § 119(e) to U.S. Provisional Application Ser. No. 63/196,545 filed Jun. 3, 2021 entitled "DISSOLVABLE SLEEVE FOR HYDROCARBON WELL COMPLETIONS," which is incorporated herein in its entirety.

STATEMENT REGARDING FEDERALLY SPONSORED RESEARCH

None.

FIELD OF THE INVENTION

This invention relates to the methods and apparatus for facilitating completion of oil and gas wells.

BACKGROUND OF THE INVENTION

When completing a hydrocarbon producing well (or water injection well) a liner may be cemented into the hydrocarbon producing formation. The operation of cementing involves passing cement down the liner, out of the distal end of the liner and into the annular space between liner and rock formation (the annulus). Ideally, all the cement passes into the annulus and none remains in the liner. However, in practice some cement will remain on surfaces inside the liner.

Loose solid material in the liner is to be avoided because of the potential negative effect this may have should it pass into the producing formation. The liner may include completion equipment, e.g. filters, sleeves, etc., some of them activated by ball-drop. The internal profile of the liner with this equipment may be complex and may, e.g., include perpendicular steps/shoulders. Cement can be trapped by this complex inner profile. The operation of the equipment, such as sliding sleeves, may be impaired by trapped, set cement.

Following cementing, it is normally necessary to perform a cleanout operation to remove residual cement before displacing with completion fluid preparatory to performing completion operations. One way of cleaning the inner surface of the liner is to drop or pump a wiping/cleaning device down the liner that is designed to engage with the inner liner surface and wipe it clean as it moves along. The device often takes the form of an elongate body with angled, flexible fins that resiliently engage with the interior of the liner. This kind of device is commonly known as a wiper dart, and for these purposes the term "wiper dart" will be used to describe any device designed to engage with the inner liner surface and wipe it clean.

Whilst the wiper dart is effective at cleaning a uniform liner surface, it may leave deposits of cement and other debris in parts of the completion equipment due to the complex profile of such equipment. The profile of the completion equipment normally includes recesses or cavities which are very prone to these deposits. In particular, a sharp or perpendicular step in the profile, facing either distally or proximally, can create a region which is inaccessible to the wiper dart and therefore trap residual cement or other solid debris. This cement/debris can be a source of contamination of the formation and can plug completion apertures in the liner. Even more importantly, the deposits may impair or prevent functioning of the completion equipment. Sliding sleeves are a common component of completion equipment and are especially vulnerable to this problem since they tend to have profiles which include perpendicular steps and because cement/debris deposits can prevent axial sliding movement of the sleeve. As completion techniques advance and downhole equipment becomes ever more complex, this issue is becoming more and more important.

Many designs of wiper dart have been proposed to attempt to overcome this problem, including darts with very flexible/resilient fins and fins of different shapes, but none is completely effective.

BRIEF SUMMARY OF THE DISCLOSURE

The inventors have appreciated that it is unlikely that any design of wiper dart will be able to clean completely many of the complex completion equipment profiles in current use. They have therefore proposed an alternative solution, which is to shield the completion equipment using an inner protective sleeve which can cover the completion equipment, or any other part of the liner with an uneven inner profile, and create a uniform surface which a wiper dart can clean effectively. This sleeve can then be removed once the cleaning operation has been performed, leaving the completion equipment (or other non-uniform inner liner profile) exposed, clean of cement/debris, and ready for use.

The inventors believe that one way of achieving this would be to provide a protective sleeve made of a material which can be dissolved away by a chemical which may be passed through the liner. For example, acid stimulation fluid (e.g. 28% hydrochloric acid) which is commonly used for stimulating the formation could also be used to dissolve away a protective sleeve of, e.g., aluminium. The outer profile of the sleeve could be formed to fit closely with the profile of the completion equipment, thereby keeping the sleeve in place and providing additional protection against cement/debris entering any of the recesses/cavities in the equipment profile.

The inner surface of the sleeve may have profiled proximal and distal (entry and exit, upper and lower) inner surfaces to create a smooth transition between the uniform inner liner surface on each side of the region with completion equipment (or other non-uniform inner profile). Otherwise the bore of the protective sleeve would have a uniform circular cross section. In this way, a wiper dart will only need to negotiate a smooth, gradual change in the diameter of the liner bore with no substantial steps or other irregularities. Wiper darts, especially those with flexible fins, are generally able to negotiate such changes in bore diameter well, and to provide effective cleaning of both diameters and the transition sections.

Other dissolvable components for downhole use are well known, e.g. balls and frac plugs or gaseous frac plugs. Other commonly used dissolvable materials include, e.g., thermoplastics and magnesium alloys and these could be used for the dissolvable sleeve of the invention.

Alternative materials for the sleeve include composites or resin materials. If such materials were used, the sleeve could be milled out rather than being dissolved away. Other materials may be also be suitable for milling away.

Although it is known to use dissolvable downhole components, e.g. balls and frac plugs, the inventors do not believe a dissolvable protective sleeve for this purpose has been proposed before, despite the long standing nature of the technical problem.

US2019040695A1 describes a dissolvable sleeve to protect a nipple profile in completion operations. The purpose of the sleeve is not to facilitate cleaning but rather to protect the nipple profile from inadvertent damage. The sleeve described and shown in US2019040695A1 may in fact cause problems with cleaning, since it creates an inner profile with sharp steps at each end.

The invention more particularly includes a process for cleaning a liner or casing prior to completion, wherein the liner or casing has a region with a non-uniform inner profile, the process comprising:
 a) installing a protective sleeve (also known as an insert) in the liner extending over the said region, the protective sleeve or insert having a through bore with a substantially circular section;
 b) passing a wiper dart or other cleaning device through the said region;
 c) removing the sleeve; and
 d) performing the completion.

Optionally, the sleeve or insert has no abrupt changes in diameter or shoulders.

The non-uniform region comprises, for example, completion equipment having a non-uniform inner profile.

The sleeve or insert may have an outer profile complementary to the non-uniform inner profile of the completion equipment. The bore of the sleeve may have tapered distal and/or proximal regions, to provide a smooth transition between the uniform liner/casing bore distally and proximally of the non-uniform region.

The step of removing the sleeve may comprise dissolving the sleeve by means of a fluid, e.g. acid, passed through the sleeve. Alternatively, it may comprise milling away the sleeve using a milling tool.

In another aspect, the invention comprises a sleeve or insert having a through bore with a substantially circular cross section with no abrupt changes in diameter and an outer surface profiled in a complementary manner to a non-uniform inner profile of a region of liner or casing, the sleeve being made from a material which is dissolvable by means of a fluid or is millable by a downhole milling tool.

The bore of the sleeve/insert may have tapered distal and/or proximal regions. The insert or sleeve may be made from aluminium or another material dissolvable by acid.

In another aspect, the invention comprises an assembly comprising a liner or casing having a region with an non-uniform inner profile and a sleeve or insert as described in any of the paragraphs above fitted to the region, whereby a bore through the assembly is provided having a circular cross section with no abrupt changes in diameter or shoulders. The said region may comprise completion equipment having a non-uniform inner profile.

Examples and various features and advantageous details thereof are explained more fully with reference to the exemplary, and therefore non-limiting, examples illustrated in the accompanying drawings and detailed in the following description. Descriptions of known starting materials and processes can be omitted so as not to unnecessarily obscure the disclosure in detail. It should be understood, however, that the detailed description and the specific examples, while indicating the preferred examples, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but can include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The term substantially, as used herein, is defined to be essentially conforming to the particular dimension, shape or other word that substantially modifies, such that the component need not be exact. For example, substantially cylindrical means that the object resembles a cylinder, but can have one or more deviations from a true cylinder.

An abrupt change in diameter is defined as a diameter change wherein the axial distance over which the total change in diameter occurs is less than 50% (0 to 50%) of the diameter change, optionally less than 30% (0 to 30%), such as less than 10% (0 to 10%). Another way of describing this is a shoulder, where a shoulder means a transverse surface bridging two inner cylindrical surfaces of different diameters where the angle of the transverse surface is e.g. between 60 and 90 degrees to the axis, optionally between 80 and 90 degrees to the axis. The shoulder (transverse surface) may be curved, in which case the angles are calculated based in a notional plane of greatest possible angle to the axis, drawn between the two diameters.

Additionally, any examples or illustrations given herein are not to be regarded in any way as restrictions on, limits to, or express definitions of, any term or terms with which they are utilized. Instead, these examples or illustrations are to be regarded as being described with respect to one particular example and as illustrative only. Those of ordinary skill in the art will appreciate that any term or terms with which these examples or illustrations are utilized encompass other examples as well as implementations and adaptations thereof which can or cannot be given therewith or elsewhere in the specification and all such examples are intended to be included within the scope of that term or terms. Language designating such non-limiting examples and illustrations includes, but is not limited to: "for example," "for instance," "e.g.," "In some examples," and the like.

Although the terms first, second, etc. can be used herein to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the present inventive concept.

BRIEF DESCRIPTION OF THE DRAWINGS

A more complete understanding of the present invention and benefits thereof may be acquired by referring to the follow description taken in conjunction with the accompanying drawings in which:

FIG. 1 is a highly schematic section through a portion of liner incorporating completion equipment, showing a known type of wiper dart passing through;

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
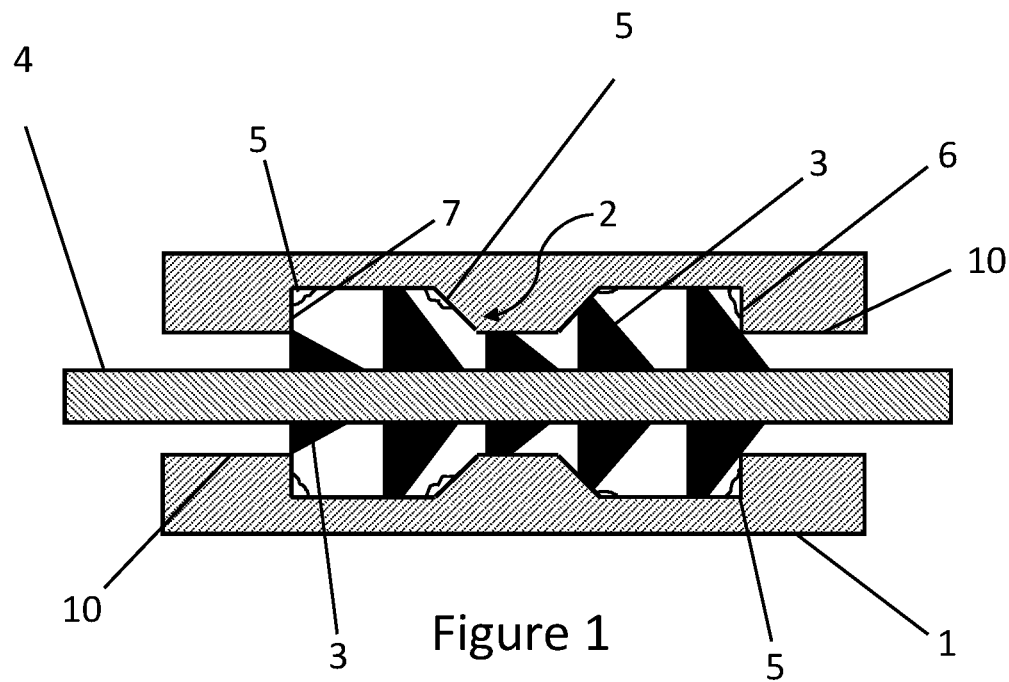

FIG. 1 represents the prior art. A schematic section through a portion of a completion liner 1 is shown. The liner 1 is installed in a wellbore (not shown) intended for hydrocarbon production or for water injection to facilitate hydrocarbon production. The liner 1 is fitted with completion equipment, e.g. sliding sleeves, valves, etc., all of which is conventional and would be familiar to one skilled in this field. The liner 1, with completion equipment, has an irregular internal profile 2. Although a liner is shown and described, the embodiment shown in the Figures could alternatively represent a casing.

The liner 1 has just had cement displaced through it in order to fill the annular space between it and the wellbore, thereby cementing the liner in place prior to completion. This process will have left residual cement in the liner 1, especially in parts of the irregular inner profile 2. Residual cement is shown in FIG. 1 by reference numerals 5.

A wiper dart comprising a number of elastomeric fins 3 is shown being passed through the liner on drill string 4. The dart is passed down the liner 1 from left to right in FIG. 1, which is from the more proximal end of the liner (with respect to the surface) to the more distal end (i.e. the end nearer the bottom end of the wellbore). Whilst the wiper dart is effective at removing cement from the relatively uniform parts of the liner inner profile, numbered 10 on the left and right of FIG. 1, cement is often not effectively removed by the wiper from the irregular profile, leaving pockets 5 of residual cement. The elastomeric fins 3 are designed to deform to adapt to different inner diameters of the liner but the ability of the fins to conform completely to the inner profile 3 is limited. Where there is a sharp shoulder in the inner profile, e.g. as shown at reference 6, it may be impossible for the wiper dart fins to access it. This is especially true for a shoulder with a distally-directed surface as shown in FIG. 1 at reference 7.

If pockets 5 of cement remain, the cement may set and can obstruct the functioning of the completion components, e.g. sliding sleeves, installed in the liner 1. The cement can also become loosened over time and contaminate fluids in the well.

Figure 2:
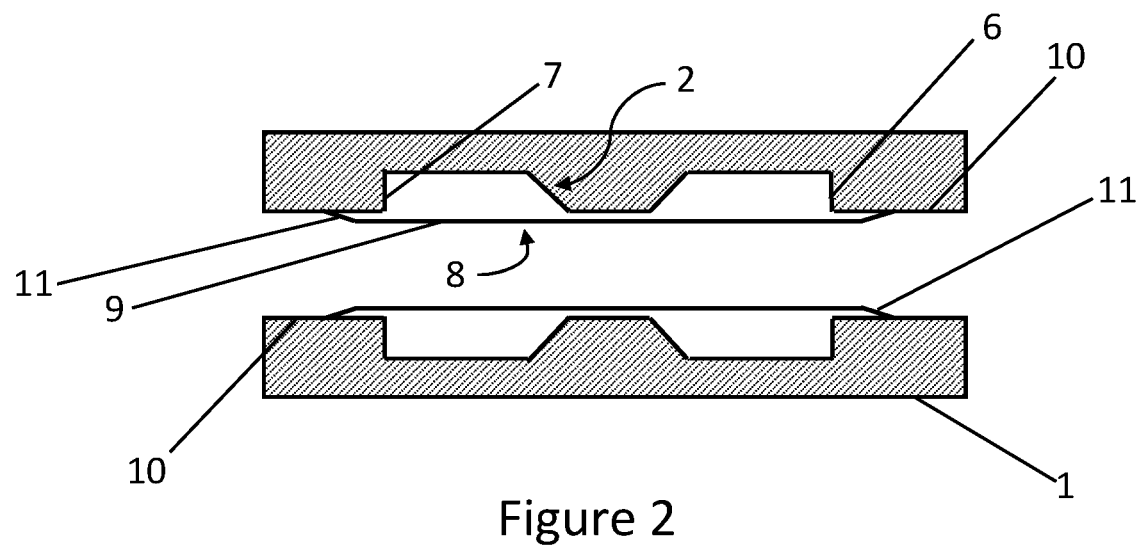
FIG. 2 is a view similar to FIG. 1 showing a protective sleeve according to the invention in place.

FIG. 2 shows a similar section of liner 1 with completion equipment making an irregular inner profile 2. An insert 8 is fitted to the liner and completion equipment prior to running the liner into the well bore. In fact the insert 8 may be included with the completion equipment at the manufacturing stage. The insert fits snugly to the inner profile 2 of the liner and completion equipment. In this embodiment, the inner surface 9 of the insert 7 is slightly proud of the regular parts 10 of the liner inner surface on each side of the irregular surface 2. The insert 9 has profiled proximal and distal (entry and exit) inner surfaces 11 to create a smooth transition between the uniform inner liner surface 10 on each side of the irregular surface 2.

In an alternative embodiment, the inner surface 9 of the insert is flush with the uniform portions 10 of inner liner surface.

When a wiper dart (not shown in FIG. 2) is passed through the liner with the insert/sleeve 8, there are no abrupt shoulders to trap cement and the wiper may efficiently clean the whole surface of the insert.

After cleaning, the well is then completed. Since this requires access to the completion equipment, the insert/sleeve needs to be removed. The insert is made from aluminium metal in contrast to the remainder of the liner and completion equipment which is of steel. Aluminium is considerably more reactive than steel and can be dissolved away using standard 28% hydrochloric acid such as is commonly used in completions in carbonate reservoirs. Once acid has been passed down the liner, the completion equipment including sliding sleeves, etc. is freed up and a standard completion operation can be carried out.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. US2019040695, "Sacrificial Protector Sleeve," (2016).

The invention claimed is:

1. A process for cleaning a liner or casing prior to completion, wherein the liner or casing has a region with a non-uniform inner profile, the process comprising:
   a) installing a protective sleeve in the liner or casing, the sleeve extending over the said region, the protective sleeve having a through bore with a substantially circular section;
   b) passing a wiper dart or other cleaning device through the said region;
   c) removing the sleeve; and
   d) performing the completion;
   wherein an inner surface of the sleeve is tapered at a distal end of the sleeve, at a proximal end of the sleeve or at both the distal and proximal ends of the sleeve, whereby the wiper dart negotiates a gradual change in diameter on passing through the said region.

2. The process according to claim 1, wherein the sleeve has no abrupt changes in diameter or shoulders.

3. The process according to claim 1, wherein the said region comprises completion or other equipment having a non-uniform inner profile.

4. The process according to claim 3, wherein the sleeve has an outer profile complementary to the non-uniform inner profile of the said equipment.

5. The process according to claim 1, wherein the step of removing the sleeve comprises dissolving the sleeve.

6. The process according to claim 5, wherein the sleeve is dissolved in a fluid selected from well bore fluid, acid, alcohol, surfactant, and combinations thereof.

7. The process according to claim 1, wherein the step of removing the sleeve comprises milling away the sleeve using a milling tool.

8. A sleeve having a through bore with a substantially circular cross section with no abrupt changes in diameter and an outer surface profiled in a complementary manner to a non-uniform inner profile of a region of liner or casing, the sleeve being made from a material which is dissolvable or millable, wherein an inner surface of the sleeve is tapered at a distal end of the sleeve, at a proximal end of the sleeve or at both the distal and proximal ends of the sleeve.

9. The sleeve according to claim 8, being made from aluminium, magnesium, thermoplastic, composite, or a combination thereof.

10. An assembly comprising:
a) a liner or casing having a region with a non-uniform inner profile; and
b) fitted to the said region, a sleeve having a through bore with a substantially circular cross section with no abrupt changes in diameter and an outer surface profiled in a complementary manner to the non-uniform inner profile of the said region of liner or casing, the sleeve being made from a material which is dissolvable or millable, wherein an inner surface of the sleeve is tapered at a distal end of the sleeve, at a proximal end of the sleeve or at both the distal and proximal ends of the sleeve;
whereby a bore through the assembly is provided, the bore having a circular cross section with no abrupt changes in diameter or shoulders.

11. The assembly of claim 10, wherein the said region comprises completion or other equipment having a non-uniform inner profile.

12. The sleeve according to claim 10, being made from aluminium, magnesium, thermoplastic, composite, or a combination thereof.

\* \* \* \* \*